United States Patent
Welch et al.

(10) Patent No.: US 9,031,943 B2
(45) Date of Patent: May 12, 2015

(54) METHOD AND SYSTEM FOR REALTIME DE-DUPLICATION OF OBJECTS IN AN ENTITY-RELATIONSHIP GRAPH

(75) Inventors: Michael Jason Welch, Mountain View, CA (US); Aamod Sane, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 335 days.

(21) Appl. No.: 13/470,397

(22) Filed: May 14, 2012

(65) Prior Publication Data

US 2013/0301874 A1    Nov. 14, 2013

(51) Int. Cl.
*G06F 17/30* (2006.01)

(52) U.S. Cl.
CPC .... *G06F 17/30864* (2013.01); *G06F 17/30522* (2013.01); *G06F 17/3053* (2013.01)

(58) Field of Classification Search
CPC ...................... G06F 17/30097; G06F 17/30864
USPC ............ 707/999.005; 713/189; 370/351, 400, 370/401
See application file for complete search history.

(56) References Cited

U.S. PATENT DOCUMENTS

| | | | | |
|---|---|---|---|---|
| 7,225,202 | B2* | 5/2007 | Focazio et al. | 707/999.103 |
| 7,698,267 | B2* | 4/2010 | Papakonstantinou et al. | 707/999.005 |
| 8,050,251 | B2* | 11/2011 | Ongole et al. | 370/351 |
| 2009/0171790 | A1* | 7/2009 | Nagarajayya | 705/14 |
| 2012/0066222 | A1* | 3/2012 | Nguyen | 707/737 |
| 2013/0067237 | A1* | 3/2013 | Huang et al. | 713/189 |

* cited by examiner

*Primary Examiner* — Anteneh Girma
(74) *Attorney, Agent, or Firm* — Pillsbury Winthrop Shaw Pittman LLP (57) ABSTRACT

Method, system, and programs for realtime de-duplication of objects. A received object is hashed to generate a hashed object, which is then used to generate a query for an inverted index. Candidate matching objects are determined based on the query of the inverted index. From the candidate matching objects, a matched object that corresponds to the received object is determined.

20 Claims, 11 Drawing Sheets

METHOD AND SYSTEM FOR REALTIME DE-DUPLICATION OF OBJECTS IN AN ENTITY-RELATIONSHIP GRAPH

BACKGROUND

1. Technical Field

The present teaching relates to the methods, systems and programming for processing information. Particularly, the present teaching is directed to methods, systems, and programming for processing information using de-duplication.

2. Discussion of Technical Background

The advancement of the Internet has made it possible to make a tremendous amount of information accessible to users located anywhere in the world. With the explosion of information, new issues have arisen. First, much effort has been put into organizing the vast amount of information to facilitate the search for information in a more effective and systematic manner. Along that line, different techniques have been developed to automatically or semi-automatically categorize content on the internet into different topics and organize them in an, e.g., hierarchical fashion. Some techniques involve the creation of a grid-based system to facilitate large-scale clustering of data and the de-duplication of redundant data objects within the system. Imposing organization and structure on content has led to more meaningful search and has promoted more targeted commercial activities. For example, associating a piece of content with a designated topic identifier often greatly facilitates the presentation of information that is more on the point and relevant. However, the categorization of new content for incorporation into an existing database is a relatively slow process.

New, time-sensitive information content relevant to existing content is constantly being created and existing solutions fail to incorporate such changes into existing categorization systems in a timely manner. An important issue has to do with how to quickly categorize useful information out of massive amounts of available content in order to make that information available to users within a matter of minutes. For example, certain processing and enriching systems commissioned with the task of identifying relationships between pieces of information content take in source objects from various feeds, finds duplicates, and merge them to create a composite object. These processes may be performed periodically at specific times and may require several hours or even days to fully integrate newly generated content into a searchable database, grid, index, or other system. Whereas certain types of content, such as limited-time offers or auctions, are time-sensitive, existing processing methods and systems are simply too slow to be able to categorize and index this information such that it can be provided to users within the pertinent timeframe.

SUMMARY

The present teaching relates to the methods, systems and programming for processing information. Particularly, the present teaching is directed to methods, systems, and programming for processing information in.

In an embodiment, a method, implemented on at least one computing device having at least one processor, storage, and a communication platform connected to a network for real-time de-duplication of objects is disclosed. A received object is hashed to generate a hashed object, which is then used to generate a query for an inverted index. Candidate matching objects are determined based on the query of the inverted index. From the candidate matching objects, a matched object that corresponds to the received object is determined.

In an embodiment, a system for realtime de-duplication of objects is disclosed. The system includes a hashing unit for hashing a received object to generate a hashed object, an inverted index query generation unit for generating a query for an inverted index using the hashed object, a candidate determiner for determining candidate matching objects based on the query of the inverted index, and a matched object determination unit for determining a matched object corresponding to the received object from the candidate matching objects.

Other concepts relate to software for implementing the realtime de-duplication of objects. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In an embodiment, a machine readable, non-transitory tangible medium having information recorded thereon for providing realtime de-duplication of objects, where the information, when read by the machine, causes the machine to hash a received object to generate a hashed object, generate a query for an inverted index using the hashed object, determine candidate matching objects based on the query of the inverted index, and determine a matched object corresponding to the received object from the candidate matching objects.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to processing information. One embodiment of the present teaching further relates to processing input objects from feeds, websites, and/or other content sources available on a network or other online source using de-duplication techniques. One embodiment of the present teaching involves realtime de-duplication of objects in an entity-relationship graph. In one embodiment, the present teaching involves a realtime system that operates on a limited view of a full data set to provide the same information processing decisions as a grid-based object de-duplication and relationship discovery mechanism that processes the full data set. In this embodiment, the present teaching exploits inverted indices based on the results of previous grid decisions to not only provide a faster, more efficient process of categorizing and indexing time-sensitive information, but also to facilitate the generation of an improved, searchable index on the grid-based system. The realtime de-duplication of this embodiment not only generates indices of new, potentially time-sensitive information, but also provides expedient updates to objects already existing within the system. In this way, the realtime system may be capable of constantly updating the information associated with existing objects in the same way that the information would be updated during a regular indexing process. In the event the updated information is later discovered to be incorrect or inconsistent with other information regarding the same object, the present teaching allows for the decisions of the realtime system to be corrected by the indexing processes performed by an underlying grid-based system.

According to one embodiment, the present teaching involves a realtime system that operates on top of an inverted index. In this embodiment of the present teaching, the new objects to be indexed are generated as an output of a grid processing system, which creates a set of hashes or attributes of each object containing the data necessary to retrieve the objects and compares the new objects with existing objects in the search engine or database. In another embodiment of the present teaching, an object is submitted as a query in the realtime system. In this embodiment of the present teaching, certain type-specific hashes that are used in a grid processing system are also applied to the object to generate a query for the inverted index. Candidate matching objects are then retrieved and ranked using standard search engine techniques. For each of these candidate objects, an entity-specific similarity function, which may be similar or identical to the function used on the grid, is applied and the candidate objects are re-ranked according to these scores. In this embodiment of the present teaching, similarity scores of the top ranked object that register above a configurable threshold are returned to the user as the existing object which matches the submitted query. If no sufficiently similar objects are found, the query object is added to the inverted index as a new object and returned to the user. In this embodiment of the present teaching, these match or no-match decisions, along with the query data, are forwarded to the grid processing system for use in its next run.

In an embodiment of the present teaching, the grid system operates independently of the realtime system. In this embodiment, the realtime system categorizes and indexes information using, in general, the same decision-making criteria as the grid system, promoting continuity between the indices created by the respective systems. In addition, the independent operation of the realtime system and the grid system not only allows the realtime system to categorize and index new or existing objects within minutes of that information becoming available, but also allows the grid system to later confirm or correct the decisions made by the realtime system. Within this embodiment, an inverted index is built using the results from the grid system and the decisions made by the realtime system. In an embodiment, updated match decisions are transmitted from the realtime system to the grid system and the respective match decisions made by the grid system and the realtime system regarding the same objects are compared. Where the grid system and realtime system have made the same match or no-match decision with respect to a given object, that decision is reflected in the knowledge database and no further action is required. However, if the realtime system has determined a match between a query object and an object in the database, but the grid system later determines there to be no-match, the grid system may make necessary updates to the knowledge base, such as splitting the objects subject to the match decision, merging the query object with some other object, or adding the query object as a new object to the knowledge base. Similarly, if the realtime system has determined there to be no-match between a query object and an object in the database, but the grid system determines there to be a match, the grid system may generate the necessary updates to the knowledge base, such as merging the matched objects and/or generating a redirection from the query object to the existing object to indicate the match between the two.

Figure 1:
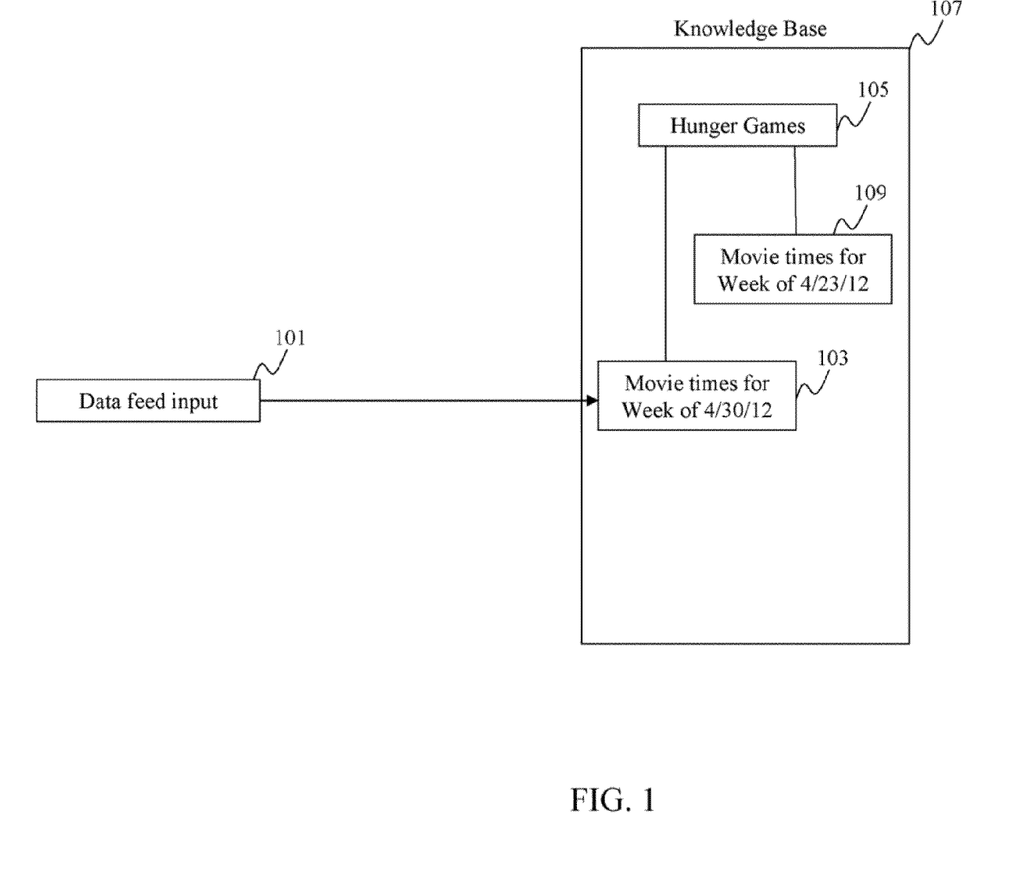
FIG. 1 depicts an exemplary plurality of objects that are matched to another object, according to an embodiment of the present teaching.

According to one embodiment of the present teaching, new details about an existing entity are matched against the existing entity in a knowledge base. FIG. 1 illustrates an example in data feed input 101 in the form of "Movie times for Week of 4/30/12" 103 is matched with the existing entity "Hunger Games" 105 within a knowledge base 107. In this example, the existing entity "Hunger Games" 105 was already associated with data "Movie times for Week of 4/23/2012" 109 prior to the introduction of the "Movie times for Week of 4/30/12" 103.

Figure 2:
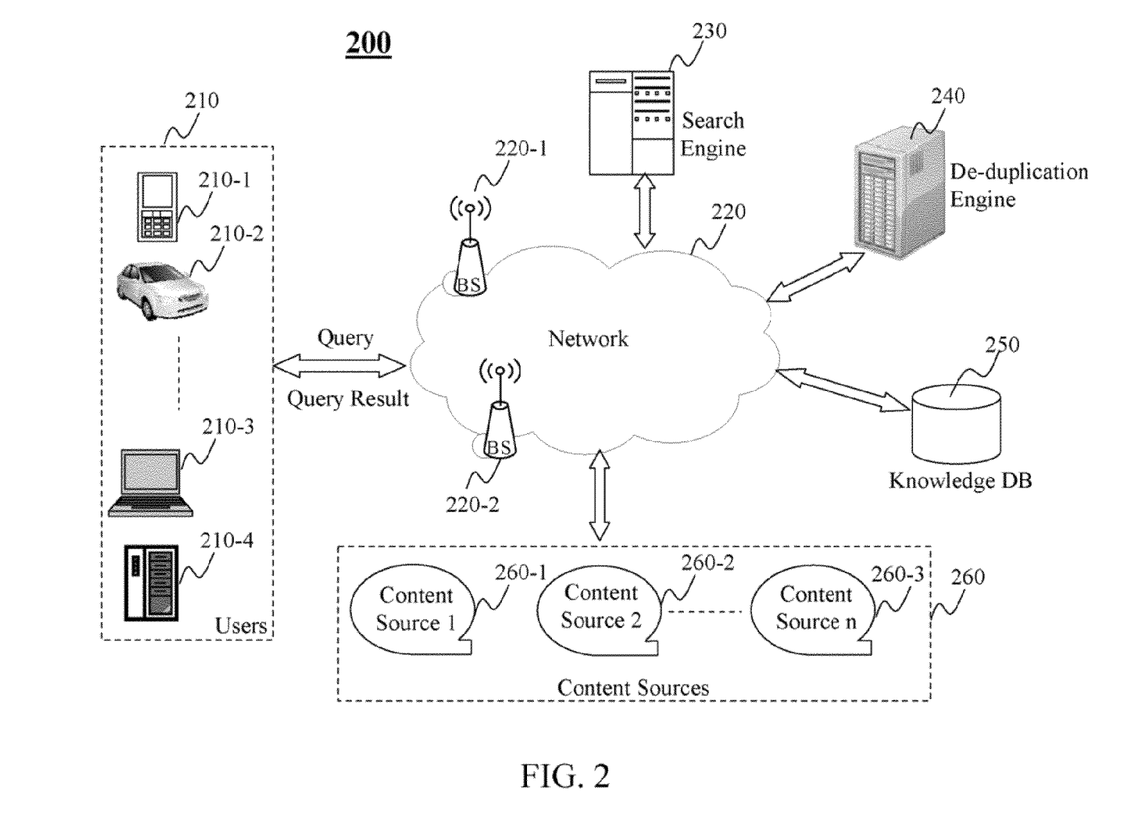
FIG. 2 is a high level depiction of an exemplary system in which de-duplication is applied, according to an embodiment of the present teaching.

FIG. 2 is a high level depiction of an exemplary system 200 in which a de-duplication engine 240 is deployed to perform realtime de-duplication of objects, according to a first application embodiment of the present teaching. The exemplary system 200 includes users 210, a network 220, a search engine 230, content sources 260, a de-duplication engine 240, and a knowledge database 250. The network 220 in system 200 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 220-1, 220-2, through which a data source may connect to the network in order to transmit information via the network.

Users 210 may be of different types such as users connected to the network via desktop connections (210-4), users connecting to the network via wireless connections such as through a laptop (210-3), a handheld device (210-1), or a built-in device in a motor vehicle (210-2). A user may send a query to the search engine 230 via the network 220 and receive a query result from the search engine 230 through the network 220.

The content sources 260 may include multiple content sources 260-1, 260-2, . . . , 260-3. A content source may correspond to a web page host corresponding to an entity, whether an individual, a business, or an organization such as USPTO.gov, a content provider such as cnn.com and Yahoo-.com, or a content feed source such as Twitter or blogs. Both the search engine 230 and the de-duplication engine 240 may access information from any of the content sources 260-1, 260-2, . . . , 260-3 and rely on such information to respond to a query (e.g., the search engine 230 identifies content related to keywords in the query and returns the result to a user), provide information regarding existing objects, or to classify new or existing entities as objects within the system. The de-duplication engine 240 may also access additional information, via the network 220, stored in the knowledge database 250, which may contain, e.g., structured information such as information about certain objects, identifiers assigned to objects, graphs of entities based on their content, events that link different objects together, etc. The information in the knowledge database 250 may be generated by one or more different applications (not shown), which may be running on the search engine 230, at the backend of the search engine 230, or as a completely stand-alone system capable of connecting to the network 220, accessing information from different sources, analyzing the information, generating structured information, and storing such generated information in the knowledge database 250.

Figure 3:
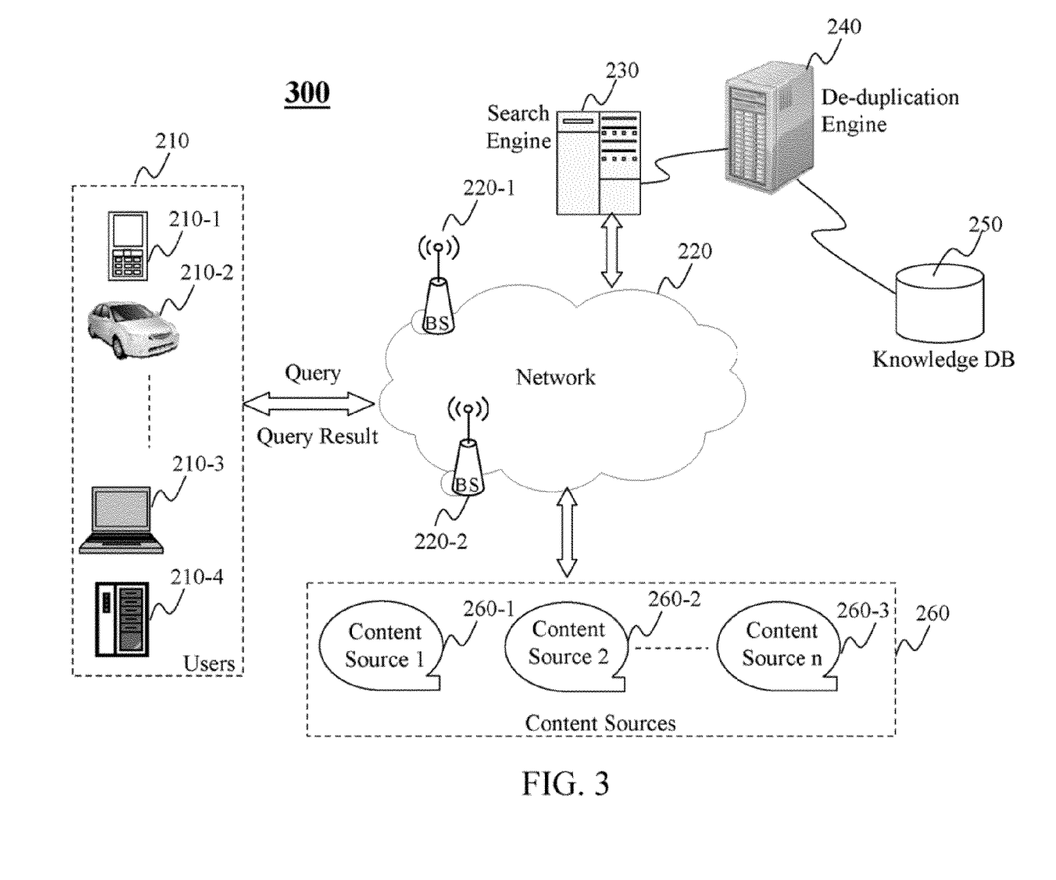
FIG. 3 is a high level depiction of an exemplary system in which de-duplication is applied, according to an embodiment of the present teaching.

FIG. 3 is a high level depiction of an exemplary system 300 in which a de-duplication engine is deployed to perform realtime de-duplication of objects, according to an embodiment of the present teaching. In this embodiment, the de-duplication engine 240 serves as a backend system of the search engine 230. All inquiries are sent to the search engine 230, which then invokes the de-duplication engine 240 to process or categorize new objects.

Figure 4:
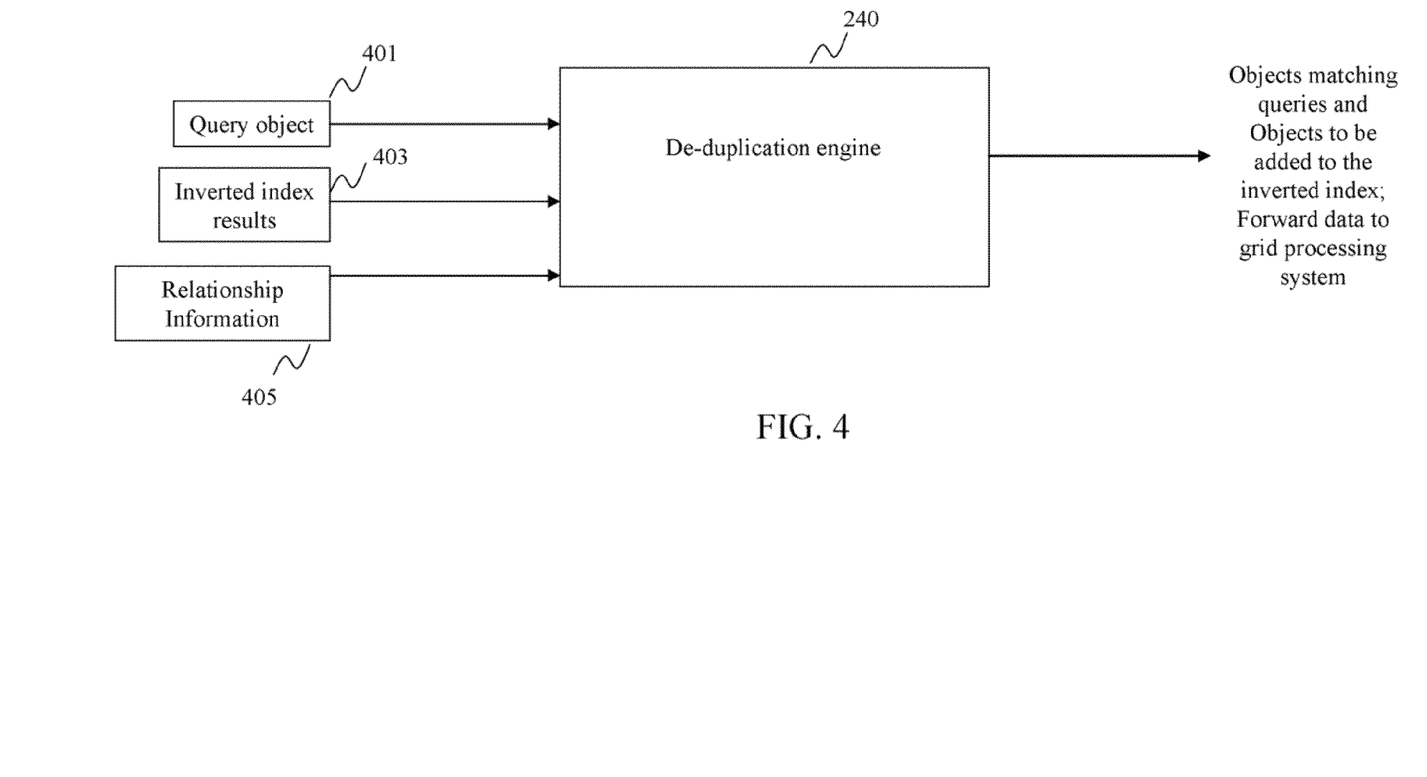
FIG. 4 depicts a high level overview of the inputs and output of an exemplary de-duplication engine, according to an embodiment of the present teaching.

FIG. 4 depicts certain inputs and output of the de-duplication engine 240, according to an embodiment of the present teaching. In the depicted embodiment, the de-duplication engine 240 receives a query object 401, inverted index results, and any existing relationship information between the two. The query object 401 of this embodiment could be, by way of example, either an object that is submitted as a query or a query generated by applying type-specific hashes used in a grid system to the object being submitted to the de-duplication engine. In one embodiment, the de-duplication engine receives a query object 401 from a network 220 or directly from a content source 260. In this embodiment, the de-duplication engine 240 receives additional information, including inverted index results 403 and relationship information 405 as inputs. The de-duplication engine 240 analyzes the query object 401, the inverted index results 403, and relationship information 405 and forwards data to a grid processing system, indicating that objects matching queries are to be added to the inverted index and/or that new objects are to be added to the inverted index in the knowledge database 250. In another embodiment, the de-duplication engine does not forward match decisions or indications that new objects should be added to the index. Yet another embodiment forwards these decisions provided certain criteria are or are not met.

Figure 5:
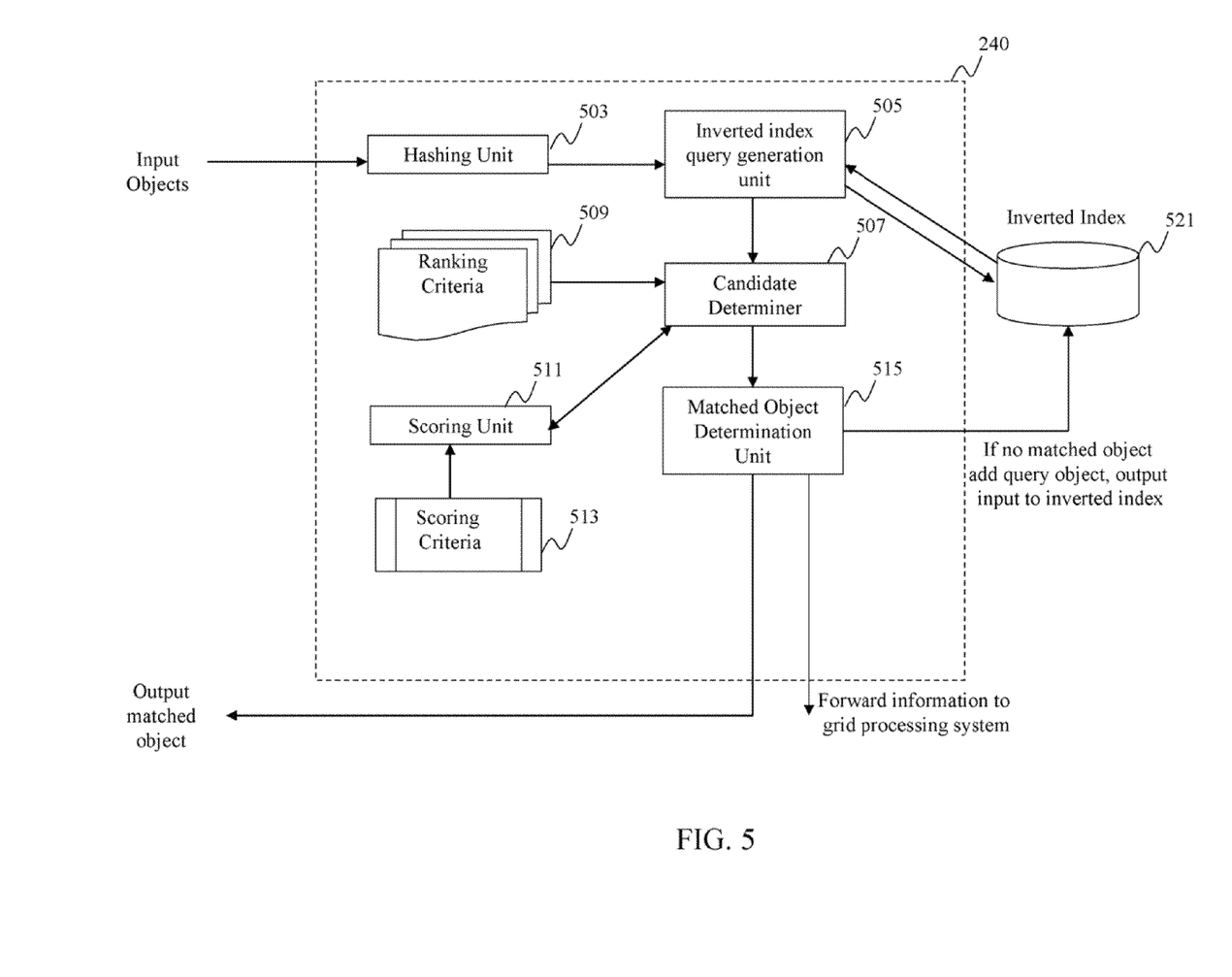
FIG. 5 is a high level exemplary system diagram of a de-duplication engine, according to an embodiment of the present teaching.

FIG. 5 depicts a high level exemplary system diagram of a de-duplication engine 240 according to an embodiment of the present teaching. As seen in the depicted embodiment, the de-duplication engine 240 includes a hashing unit 503, a inverted index query generation unit 505, a candidate determiner 507, ranking criteria 509, a scoring unit 511, scoring criteria 513, and a matched object determination unit 515.

According to the embodiment of the present teaching depicted in FIG. 5, input objects 501 are received at a de-duplication engine 240 by a hashing unit 503. The hashing unit 503 processes the received input objects, which represent a plurality of objects and applies type-specific hashes to the input objects. The hashes used by the hashing unit 503 may be the same as those used by the knowledge database 250 and contain data necessary to facilitate retrieval of the objects and compare the attributes of each object with those of other objects within the search engine 230. Once the hashes are applied to the input objects 501, the inverted index query generation unit 505 creates a query based on the hashes applied to the object by the hashing unit 503. This query is submitted to the inverted index and candidate matching objects are retrieved from the inverted index 521.

The candidate determiner 507 matches the generated query with the objects in the inverted index to determine a set of candidate objects. The candidate objects are submitted to a scoring unit 511 that scores each candidate object using scoring criteria 513. Using output from the scoring unit 511 and ranking criteria 509, the candidate determiner 507 ranks the candidate objects. The matched object determination unit 515 analyzes the ranked candidate objects to determine whether each candidate object matches the generated query. In one embodiment of the present teaching, if the similarity score of the top ranked candidate object is above a configurable threshold, the candidate object is determined to be a matched object. If no sufficiently similar objects are identified by the matched object determination unit 515, the query object is added to the inverted index 521 as a new object. In another embodiment, unmatched objects are not added to the inverted index 521. In an embodiment of the present teaching, the determinations made by the matched object determination unit 515 are forwarded along with the generated query data to the grid processing system for use in subsequent runs.

Figure 6:
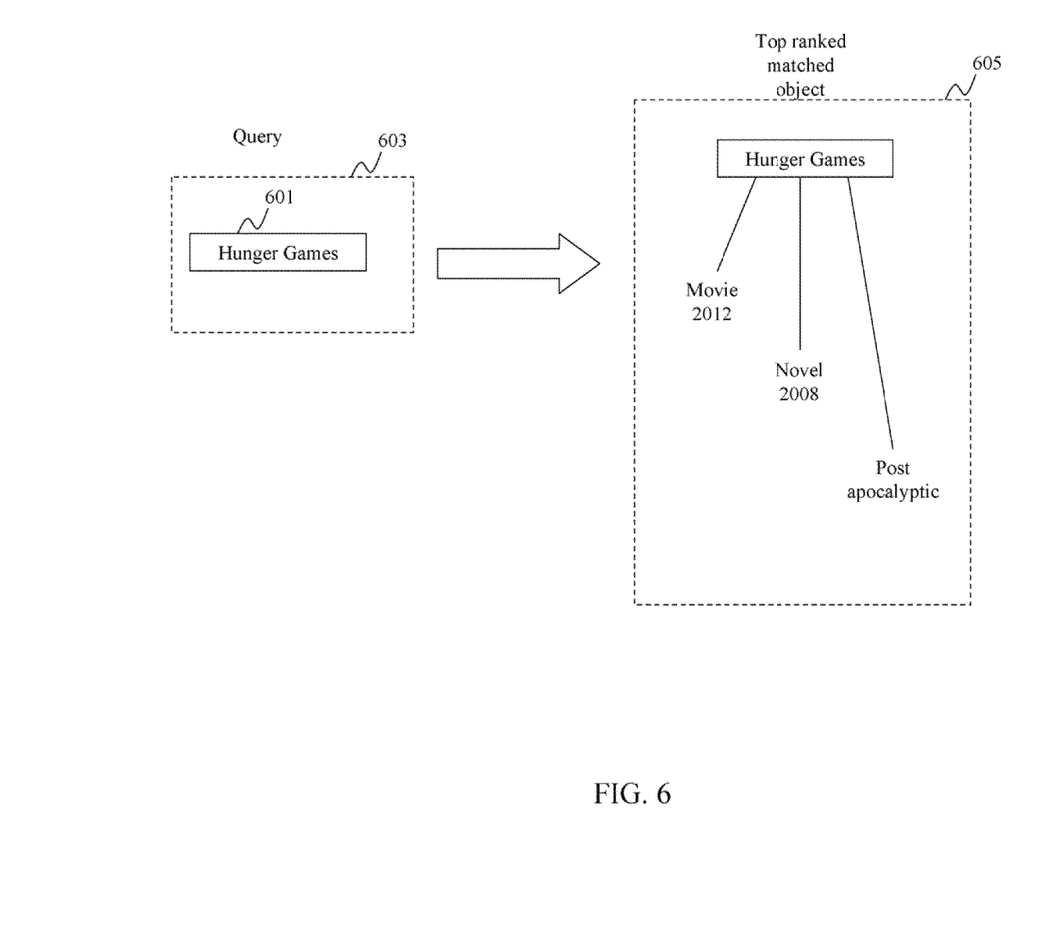
FIG. 6 shows an exemplary representation of object matching decision, according to an embodiment of the present teaching.
Figure 7:
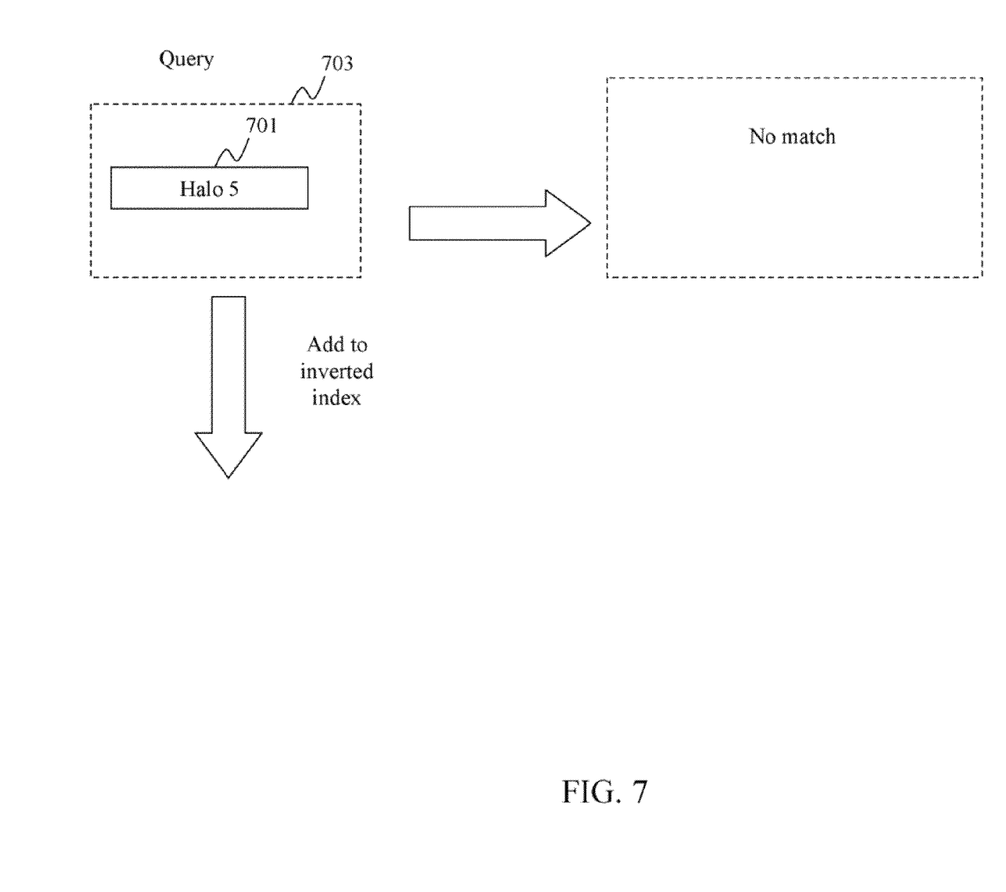
FIG. 7 shows an exemplary representation of a no-match decision, according to an embodiment of the present teaching.

FIG. 6 shows an exemplary representation of an object matching decision, according to an embodiment of the present teaching. In FIG. 6, a "Hunger Games" object 601 is submitted to the de-duplication engine as query 603. The top ranked matched object 605 with type specific hashes, such as "Movie 2012", "Novel 2008", and "Post apocalyptic" is determined to be a matched object. By way of comparison, FIG. 7 shows an exemplary representation of a no-match decision, according to an embodiment of the present teaching. In FIG. 7, a "Halo 5" object 701 is submitted to the de-duplication engine as a query 703 and no match is identified. In an embodiment, the query 703 is added to the inverted index for subsequent runs. According to another embodiment of the present teaching, the query 703 is only added to the inverted index if certain conditions are satisfied.

Figure 8:
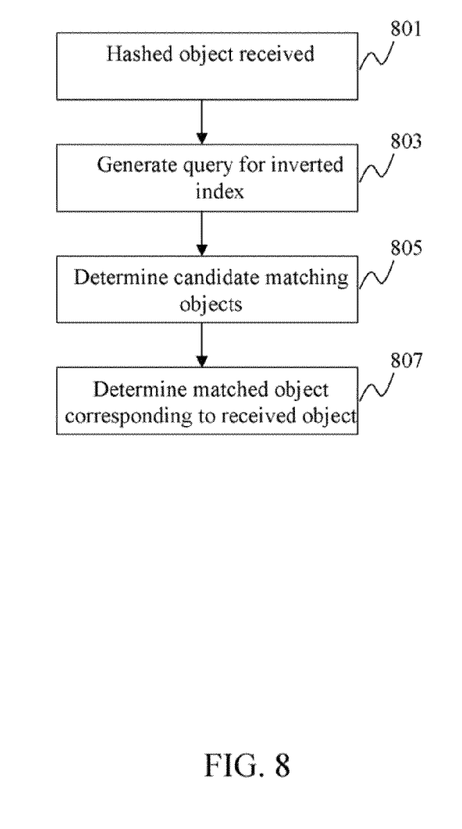
FIG. 8 depicts an exemplary process for determining a matched object, according to an embodiment of the present teaching.

FIG. 8 depicts an exemplary process for determining a matched object, according to an embodiment of the present teaching. According to this embodiment, a hashed object is received by the de-duplication engine 240 at step 801. At step 803, a query is generated for the inverted index using the object hashes. At step 805, candidate matching objects are retrieved. In an embodiment, this step is performed using standard search engine techniques. At step 807, matches between the candidate matching objects and the hashed object are determined. In one embodiment, each of the candidate objects are assessed using a similarity function that compares the candidate object with the hashed object.

Figure 9:
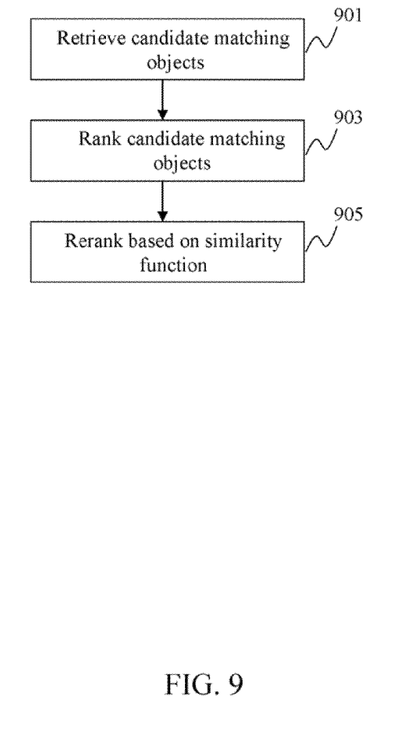
FIG. 9 depicts an exemplary process for re-ranking candidate objects, according to an embodiment of the present teaching.

FIG. 9 depicts an exemplary process for re-ranking candidate objects, according to an embodiment of the present teaching. At step 901 of this embodiment, candidate matching objects are retrieved from inverted index 521. At step 903 of this embodiment, candidate matching objects are ranked based on search engine ranking techniques. At step 905 of this embodiment, the candidate matching objects are re-ranked based on a similarity function that is applied to each of the candidate matching objects. The similarity function of this embodiment applies a similarity score to each of the retrieved candidate matching objects, comparing the candidate matching object to the input object.

Figure 10:
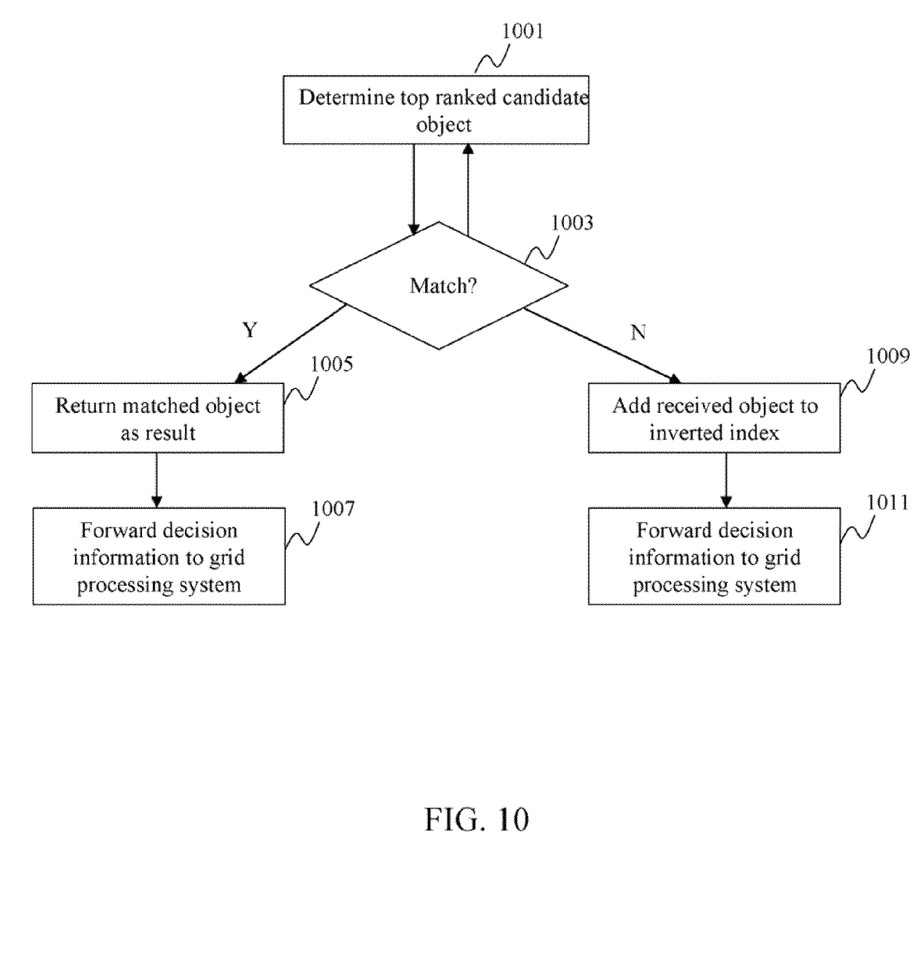
FIG. 10 depicts an exemplary process by match decisions are made and forwarded to a grid processing system, according to an embodiment of the present teaching.

FIG. 10 depicts an exemplary process by which match decisions are made and forwarded to a grid processing system, according to an embodiment of the present teaching. At step 1001, the top ranked candidate object is determined. At step 1003 of this embodiment, the de-duplication engine determines whether there is a match between the candidate object and the input object. In one embodiment, matches are determined to exist with candidate objects whose similarity scores rise above a configurable threshold. If a match is determined, the match object is returned as a result, as depicted in step 1005, and this decision information is forwarded to a grid processing system in step 1007. If no match is found, the next top ranked candidate object may be determined, and the process repeated. In the event that no top ranked candidates can be used to yield a match, the received object is added to the inverted index, as depicted in step 1009, and this decision information is forwarded to a grid processing system in step 1011.

Figure 11:
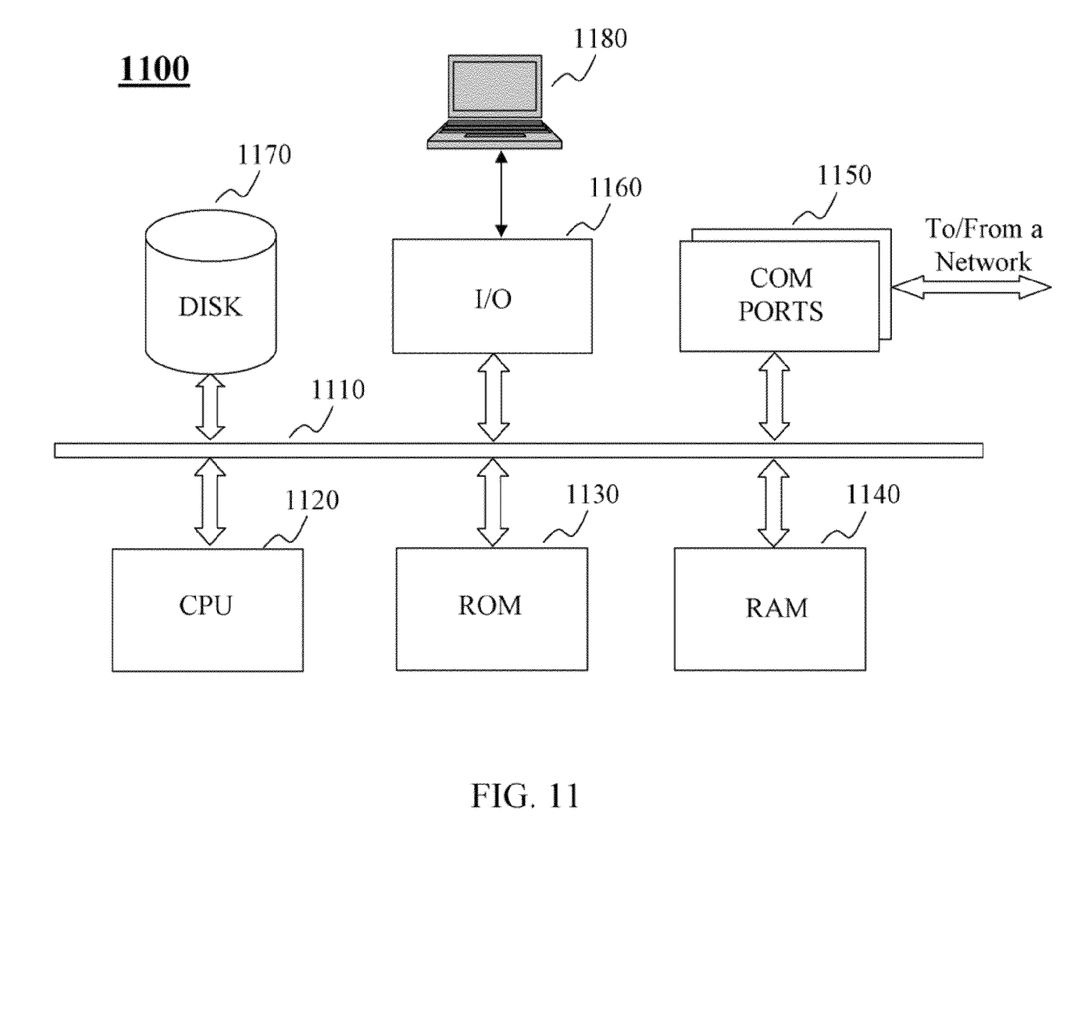
FIG. 11 depicts a general computer architecture on which the present teaching can be implemented.

FIG. 11 depicts a general computer architecture on which the present teaching can be implemented and has a functional block diagram illustration of a computer hardware platform which includes user interface elements. The computer may be a general purpose computer or a special purpose computer. This computer 1100 can be used to implement any components of the present teaching. By way of example and without limitation, the search engine 230, de-duplication engine 240, and/or knowledge DB 250 can all be implemented on a computer such as computer 1100, via its hardware, software program, firmware, or a combination thereof. In addition, the content sources 260 may reside or be hosted on a computer 1100, according to the present teaching. Although only one such computer is shown, for convenience, the computer functions relating to dynamic relation and event detection may be implemented in a distributed fashion on a number of similar platforms, to distribute the processing load.

The computer 1100, for example, includes COM ports 1150 connected to and from a network connected thereto to facilitate data communications. The computer 1100 also includes a central processing unit (CPU) 1120, in the form of one or more processors, for executing program instructions. The exemplary computer platform includes an internal communication bus 1110, program storage and data storage of different forms, e.g., disk 1170, read only memory (ROM) 1130, or random access memory (RAM) 1140, for various data files to be processed and/or communicated by the computer, as well as possibly program instructions to be executed by the CPU. The computer 1100 also includes an I/O component 1160, supporting input/output flows between the computer and other components therein such as user interface elements 1180. The computer 1100 may also receive programming and data via network communications.

Hence, aspects of the methods of receiving user queries and returning a response, e.g., a URL associated with dynamically generated web pages or the content contained in the dynamically generated web pages, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one computing device, each computing device having at least one processor, storage, and a communication platform connected to a network for realtime de-duplication of objects, the method comprising:
hashing a received object to generate a hashed object;
generating a query for an inverted index using the hashed object;
retrieving a plurality of candidate matching objects based on the query of the inverted index;
ranking the plurality of candidate matching objects;
reranking the plurality of candidate matching objects based on a similarity function applied to each of the candidate matching objects, the similarity function applying a score to each of the plurality of candidate matching objects; and
determining a matched object from the candidate matching objects, the matched object corresponding to the received object.

2. The method of claim 1, wherein the received object is submitted as a query.

3. The method of claim 1, wherein hashing a received object to generate a hashed object comprises:
applying a hash that may be used in a grid system to the received object.

4. The method of claim 1, wherein determining a matched object from the candidate matching objects, the matched object corresponding to the received object comprises:
determining a top ranked object of the candidate matching objects, wherein the top ranked object has an associated score that is above a threshold score.

5. The method of claim 1, further comprising:
returning the matched object as a result.

6. The method of claim 1, further comprising:
in response to determining that there is no matched object corresponding to the received object, adding the received object to the inverted index as a new object.

7. The method of claim 1, further comprising:
transmitting an update indicating whether a matched object has been determined, wherein the update is transmitted from a real-time de-duplication engine to a grid system.

8. A machine readable non-transitory and tangible medium having information recorded for realtime de-duplication of objects, wherein the information, when read by the machine, causes the machine to perform the steps comprising:
hashing a received object to generate a hashed object;
generating a query for an inverted index using the hashed object;
retrieving a plurality of candidate matching objects based on the query of the inverted index;
ranking the plurality of candidate matching objects;
reranking the plurality of candidate matching objects based on a similarity function applied to each of the candidate matching objects, the similarity function applying a score to each of the plurality of candidate matching objects; and
determining a matched object from the candidate matching objects, the matched object corresponding to the received object.

9. The machine readable non-transitory and tangible medium of claim 8, wherein the received object is submitted as a query.

10. The machine readable non-transitory and tangible medium of claim 8, wherein hashing a received object to generate a hashed object comprises:
applying a hash that may be used in a grid system to the received object.

11. The machine readable non-transitory and tangible medium of claim 8, wherein determining a matched object from the candidate matching objects, the matched object corresponding to the received object comprises:
determining a top ranked object of the candidate matching objects, wherein the top ranked object has an associated score that is above a threshold score.

12. The machine readable non-transitory and tangible medium of claim 8, wherein the information, when read by the machine, causes the machine to perform the step comprising:
returning the matched object as a result.

13. The machine readable non-transitory and tangible medium of claim 8, wherein the information, when read by the machine, causes the machine to perform the step comprising:
in response to determining that there is no matched object corresponding to the received object, adding the received object to the inverted index as a new object.

14. The machine readable non-transitory and tangible medium of claim 8, wherein the information, when read by the machine, causes the machine to perform the step comprising:
transmitting an update indicating whether a matched object has been determined, wherein the update is transmitted from a real-time de-duplication engine to a grid system.

15. A system having at least one processor, storage, and a communication platform connected to a network for realtime de-duplication of objects, comprising:
a hashing unit for hashing a received object to generate a hashed object;
an inverted index query generation unit for generating a query for an inverted index using the hashed object;
a candidate determiner for:
retrieving a plurality of candidate matching objects based on the query of the inverted index,
ranking the plurality of candidate matching objects, and
reranking the plurality of candidate matching objects based on a similarity function applied to each of the candidate matching objects, the similarity function applying a score to each of the plurality of candidate matching objects; and a matched object determination unit for determining a matched object from the candidate matching objects, the matched object corresponding to the received object.

16. The system of claim 15, wherein the received object is submitted as a query.

17. The system of claim 15, wherein the hashing unit is further configured for applying a hash that may be used in a grid system to the received object.

18. The system of claim 15, wherein the matched object determination unit is further configured for determining a top ranked object of the candidate matching objects, wherein the top ranked object has an associated score that is above a threshold score.

19. The system of claim 15, further comprising an output unit for returning the matched object as a result.

20. The system of claim 15, wherein the matched object determination unit is further configured for transmitting an update indicating whether a matched object has been determined, wherein the update is transmitted from a real-time de-duplication engine to a grid system.

* * * * *